(12) United States Patent
Garg et al.

(10) Patent No.: US 11,374,962 B2
(45) Date of Patent: Jun. 28, 2022

(54) METHOD AND SYSTEM FOR PREVENTION OF SPAM ATTACKS ON A BLOCKCHAIN NETWORK

(71) Applicant: MASTERCARD INTERNATIONAL INCORPORATED, Purchase, NY (US)

(72) Inventors: Chandan Garg, Haryana (IN); Jaipal Singh Kumawat, Rajasthan (IN); Nikhat Parveen, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 84 days.

(21) Appl. No.: 16/946,697

(22) Filed: Jul. 1, 2020

(65) Prior Publication Data

US 2022/0006831 A1    Jan. 6, 2022

(51) Int. Cl.
*H04L 9/40*     (2022.01)
*H04L 9/32*     (2006.01)

(52) U.S. Cl.
CPC ........ *H04L 63/1441* (2013.01); *H04L 9/3271* (2013.01); *H04L 2209/38* (2013.01); *H04L 2209/56* (2013.01)

(58) Field of Classification Search
CPC .............. H04L 63/1441; H04L 9/3271; H04L 2209/38; H04L 2209/56; H04L 9/3297; H04L 9/3239; H04L 63/1466
See application file for complete search history.

(56) References Cited

U.S. PATENT DOCUMENTS

| | | | |
|---|---|---|---|
| 10,554,407 B1* | 2/2020 | Greco | G06F 16/178 |
| 11,017,036 B2* | 5/2021 | Jakobsson | G06F 16/953 |
| 2018/0336552 A1* | 11/2018 | Bohli | H04L 67/1097 |
| 2020/0167775 A1* | 5/2020 | Reese | G06Q 20/4014 |
| 2020/0205000 A1* | 6/2020 | Daniel | H04L 63/10 |
| 2020/0211054 A1* | 7/2020 | Garg | G06Q 20/401 |
| 2020/0380091 A1* | 12/2020 | Bansal | H04L 9/0643 |

* cited by examiner

*Primary Examiner* — Christopher A Revak
(74) *Attorney, Agent, or Firm* — Buchanan Ingersoll & Rooney PC

(57) ABSTRACT

A method for reducing spam transaction submission in a blockchain network includes: receiving a transaction request from a computing device; transmitting a computational challenge to the computing device; receiving an answer to the computational challenge from the computing device; receiving a new blockchain transaction from the computing device; validating the received answer to the computational challenge; and transmitting the new blockchain transaction to a plurality of blockchain nodes in a blockchain network upon successful validation of the received answer.

16 Claims, 5 Drawing Sheets

METHOD AND SYSTEM FOR PREVENTION OF SPAM ATTACKS ON A BLOCKCHAIN NETWORK

FIELD

The present disclosure relates to reducing spam transaction submissions in a blockchain network, specifically the use of computational challenges that must be correctly answered by submitting systems in order for blockchain transactions to be considered for confirmation and addition to the blockchain.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also provides anonymity as to the individuals or entities involved in a transaction. Blockchains often rely on miners that participate in confirming transactions, where confirmation of transactions involves reviewing the entire chain to identify the unspent outputs being used in a transaction and ensuring that the currency is still available for transfer by the spender. While this can be a relatively simple operation, the operation becomes more time consuming and laborious for miners as the size of the blockchain increases.

As more transactions get submitted for confirmation and addition to the blockchain, the computing power required to process each transaction increases. In busy networks, there may be instances where there is insufficient computing power to process each transaction as they are submitted. In these cases, transaction submitters will pay fees to blockchain miners, where greater fees encourage a transaction to be taken ahead of others, as the miner is interested in collecting a higher fee to the benefit of the submitter. As a result, miners will often have greatly increased revenue as a blockchain network gets busier with transaction submissions.

In such networks, some nefarious miners will attempt to inundate the network with new blockchain transactions in order to drive up mining fees that are paid. To increase mining fees without having to pay fees themselves, these spam submissions are transactions that the submitters know cannot be confirmed, such as due to an incorrect signature, insufficient transaction amount, the use of previously spent transaction outputs, etc. The result is that the mining fees are increased through the submission of transactions that will not be confirmed, and thus are submitted without recourse by the nefarious miner. Thus, there is a need for a system to prevent such spam submissions and to introduce negative repercussions for submitting spam transactions in a blockchain network.

SUMMARY

The present disclosure provides a description of systems and methods for reducing spam transaction submissions in a blockchain network. When a computing device wants to submit a new transaction in a blockchain network, the computing device is presented with a computational challenge by a blockchain node. The computing device must answer the challenge correctly, as validated by a blockchain node, or else any submitted transaction will be ignored by the network. The computational challenge requires a solution to be identified by the computing device, the difficulty of which can be increased as the device submits more transactions or as the load of the network increases. Thus, any entity that wishes to repeatedly submit spam transactions to drive up mining fees would be required to spend significant computational power to answer the computational challenges, which negates any potential profits made through mining. The scalability of the difficulty, which can be increases only when failed transactions are submitted, can ensure that busy entities that are genuine can continue to do business without any issues, while still preventing spam submissions from fraudulent entities. The result is a system where spam transaction submissions in a blockchain network are reduced, thereby disincentivizing spam submissions.

A method for reducing spam transaction submission in a blockchain network includes: receiving, by a receiver of a processing server in a blockchain network that manages a blockchain, a transaction request from a computing device; transmitting, by a transmitter of the processing server, a computational challenge to the computing device; receiving, by the receiver of the processing server, an answer to the computational challenge from the computing device; receiving, by the receiver of the processing server, a new blockchain transaction from the computing device; validating, by a processor of the processing server, the received answer to the computational challenge; and transmitting, by the transmitter of the processing server, the new blockchain transaction to a plurality of blockchain nodes in the blockchain network upon successful validation of the received answer.

A system for reducing spam transaction submission in a blockchain network includes: a blockchain network managing a blockchain; a plurality of nodes included in the blockchain network; a computing device; and a processing server in the blockchain network, the processing server including a receiver receiving a transaction request from the computing device, a transmitter transmitting a computational challenge to the computing device, and a processor, where the receiver further receives an answer to the computational challenge from the computing device, and a new blockchain transaction from the computing device, the processor validates the received answer to the computational challenge, and the transmitter transmits the new blockchain transaction to the plurality of blockchain nodes in the blockchain network upon successful validation of the received answer.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Reducing Spam Blockchain Transactions

Figure 1:
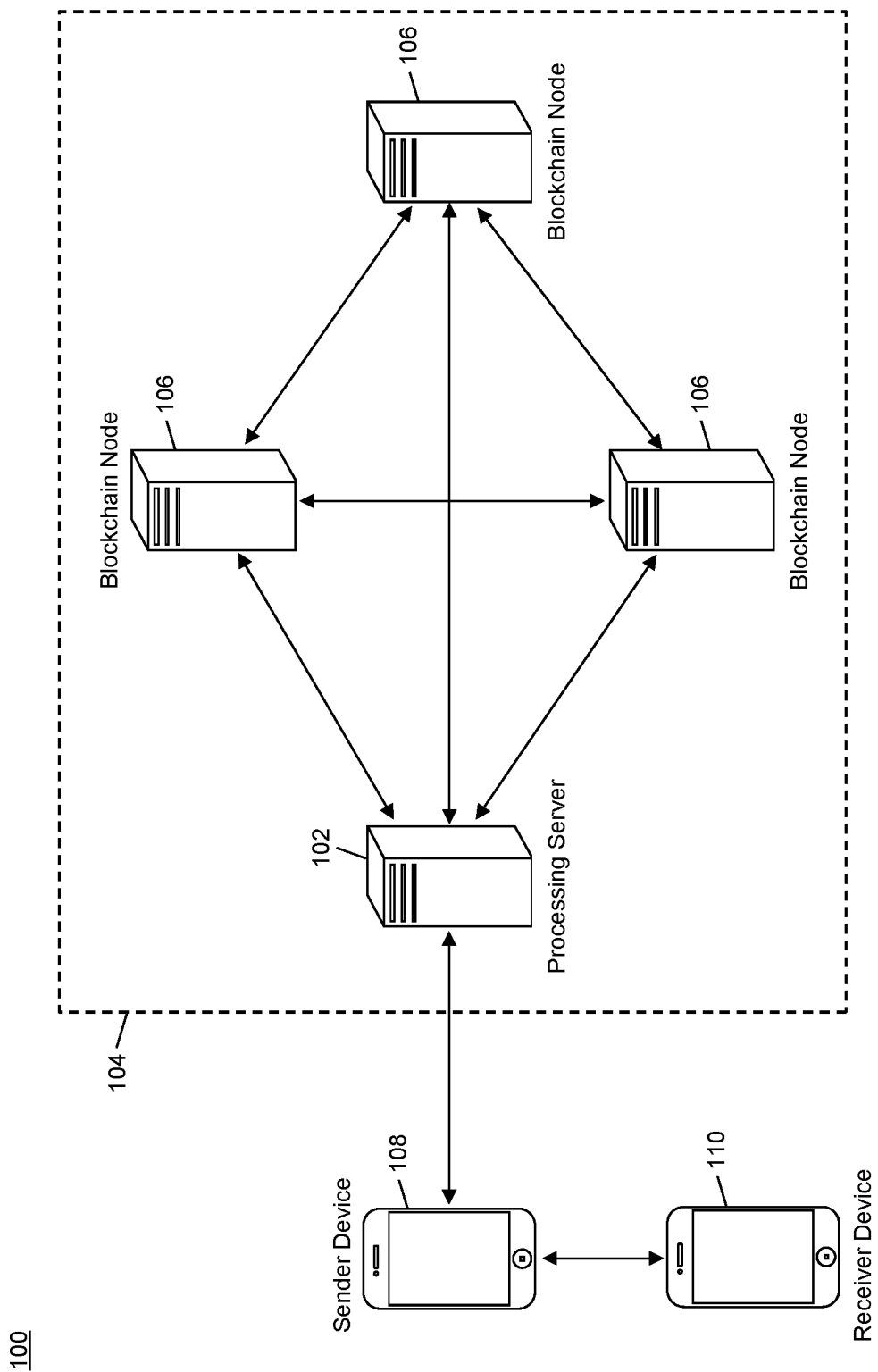
FIG. 1 is a block diagram illustrating a high level system architecture for reducing spam transaction submissions in a blockchain network in accordance with exemplary embodiments.

FIG. 1 illustrates a system 100 for reducing spam transaction submissions to a blockchain network through the use of computational challenges with scalable difficulty.

Figure 5:
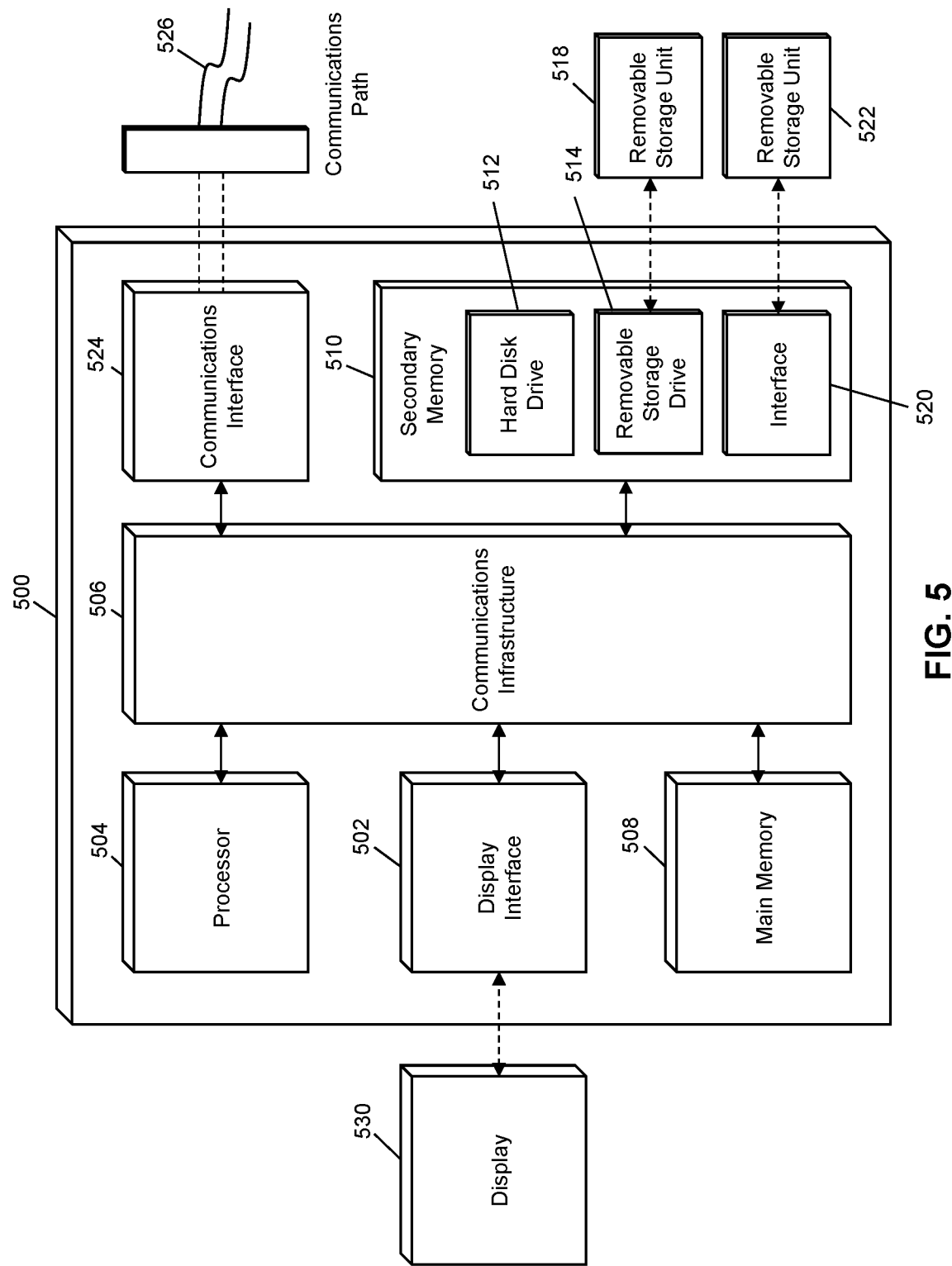
FIG. 5 is a block diagram illustrating a computer system architecture in accordance with exemplary embodiments.

The system 100 may include a blockchain network 104. The blockchain network 104 may be comprised of a plurality of blockchain nodes 106. Each blockchain node 106 may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain network 104 may also include a processing server 102. The processing server 102, discussed in more detail below, may be configured to present computational challenges that must be validated to accept a transaction for addition to the blockchain. In some embodiments, the processing server 102 may also be configured to perform the functions of a blockchain node 106. In some cases, every blockchain node 106 in the blockchain network 104 may be configured to perform the functions of the processing server 102.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 108 and receiver device 110) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 108) that is generated using the sender's private key, a blockchain address of the recipient of currency (e.g., a receiver device 110) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 106 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 106 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, sender devices 108 may be required to solve computational challenges before a blockchain node 106 may attempt to process a transaction submitted thereby for potential addition to the blockchain. When a sender device 108 wants to submit a new blockchain transaction, such as for the payment of cryptographic currency from a wallet associated with the sender device 108 to a wallet associated with the receiver device 110, then the sender device 108 may submit a transaction request to a processing server 102 in the blockchain network 104. In some embodiments, the transaction request may include the blockchain transaction that the sender device 108 wants processed. In other embodiments, the blockchain transaction may only be submitted once the computational challenge has been successfully answered by the sender device 108. The transaction request may, in some cases, include data identifying the blockchain wallet of the sender device 108, such as the public key of the cryptographic key pair thereof. In some instances, the transaction request may include a digital signature generated using the private key of the sender device's blockchain wallet, which can be validated by the processing server 102 using the public key of the sender device's cryptographic key pair, such as to validate that the sender device 108 is authorized to use the blockchain wallet for which the transaction was submitted.

The processing server 102 may receive the transaction request and may then identify a computational challenge. The computational challenge may be a computational problem that must be solved by the sender device 108 in order for the desired blockchain transaction to be processed (e.g., which may be successful or unsuccessful, as it may still be required to comply with traditional transaction requirements). The computational challenge may be, for instance, a data value that is submitted to the sender device 108 where the sender device 108 may be required to identify a nonce that, when combined with the data value and hashed using a predetermined hashing algorithm, results in an integer value having a predetermined number of leading zeroes.

In some embodiments, the processing server 102 may identify a difficulty for the computational challenge prior to identifying the challenge for presentation to the sender device 108. In some cases, the difficulty may be based on the current load of the blockchain network 104. For example, the difficulty may be scaled to be more difficult as a pool of unconfirmed or pending transaction increases, such as to reduce the rate of submission of new blockchain transactions to enable the blockchain nodes 106 to address the load. In some instances, difficulty may be increased based on the transaction history of the sender device 108. For example, the processing server 102 may identify the blockchain wallet based on data included in the transaction request and may identify the transaction history for the blockchain wallet in the blockchain. The processing server 102 may increase the difficulty for the computational challenge as the traffic for the sender device 108 increases, such as where a merchant that submits 1,000 transactions a day may be provided challenges that are significantly more difficult than an individual that submits one transaction a day. In some embodiments, difficulty scaling based on submission volume may only utilize submissions for which confirmation fails. For example, a merchant that always submits successful transactions may have a low difficulty in the presented computational challenge, while an entity that routinely submits unsuccessful transactions (e.g., spam) may have the difficulty of presented challenges continually increased, such as to prevent continued unsuccessful transactions. In some cases, a transaction history that is full of successful transactions may result in a reduced difficulty, such as due to the trustworthiness of the sender device 108 as a result of their long history.

In some cases, a combination of criteria may be used in determining challenge difficulty. For instance, a wallet that has a long history of successful transactions and only submits one transaction a day may be, under normal circumstances, provided with a challenge with a very low difficulty, but, in times of high transaction volume, may have a challenge presented thereto that is at a higher difficulty. At the same time, an entity with a limited history may be presented with a challenge of moderate difficulty during low transaction volume periods, and may be presented with a challenge of very high difficulty during high transaction volume periods.

The difficulty of a computational challenge may be increased through any mechanism that is suitable for the type of challenge. For instance, a higher difficulty may result in a challenge that requires more computing resources or may require a longer period of time to identify a correct response to the challenge. In the above example, the number of leading zeroes that must result from the hash of the data value combined with the nonce identified by the sender device 108 may be increased or decreased to increase or decrease the difficulty of the challenge, respectively. For example, in a low transaction volume period, a reliable sender device 108 with a long history may be provided a data value and be required to identify a nonce where the resulting hash only has three leading zeroes, which an unknown sender device 108 submitting a transaction request during a high volume period may be required to identify a nonce where the resulting hash has ten leading zeroes, which may be significantly more difficult.

The sender device 108 may receive the computational challenge from the processing server 102 and then attempt to identify a response to the challenge. When a response is identified, the sender device 108 may submit the response to the processing server 102 using any suitable communication network and method, such as via an application program, application programming interface, web page, etc. The processing server 102 may receive the response and attempt to validate the response. The response may be successfully validated if the response is a correct answer to the computational challenge. For instance, in the above example, a correct response to the computational challenge by the sender device 108 may be a nonce where, when hashed with the data value by the processing server 102, yields an integer that has a sufficient number of leading zeroes.

If the response is successfully validated, then the blockchain transaction submitted by the sender device 108 may then be provided to a blockchain node 106 for processing, or otherwise included in a pool of transactions awaiting confirmation and processing. In cases where the transaction request included the blockchain transaction, the blockchain transaction may be included in the pool of unconfirmed transactions immediately upon successful validation. In cases where the transaction request did not include the blockchain transaction, the processing server 102 may request the blockchain transaction from the sender device 108 after successful validation of the response to the computational challenge. The blockchain transaction may then be processed using traditional methods, where it may be confirmed and included in a new block that is confirmed and added to the blockchain, or where confirmation thereof may fail. In some cases, the processing server 102 may provide a notification message to the sender device 108 indicating that the response was successfully validated and the blockchain transaction was forwarded for processing.

If validation of the response to the computational challenge fails, then the processing server 102 may refrain from forwarding the blockchain transaction for processing and may transmit a notification to the sender device 108 using a suitable communication network and method. In some embodiments, the sender device 108 may be provided with an opportunity to submit a new response to the computational challenge. In an exemplary embodiment, the processing server 102 may increase the difficulty for the computational challenge, and may present the new, more difficult computational challenge to the sender device 108 when informing the sender device 108 of the failed validation of the challenge response. This may result in a continually increasing difficulty for a sender device 108 that is failing computational challenges.

In some embodiments, the processing server 102 may be configured to provide a notification to the sender device 108 after a submitted blockchain transaction has been processed. In cases where processing of the submitted blockchain transaction failed (e.g., the transaction is unconfirmed, such as due to an incorrect signature, insufficient funds, attempted double spend, etc.), the sender device 108 may be provided with an opportunity to submit a new blockchain transaction, but may be required to solve a more difficult computational challenge. The increasing of difficulty for the computational challenge after a failed transaction may provide for a barrier to the submission of spam transactions, as the difficulty may require significantly increasing computational power and resources that vastly reduces the speed at which spam transactions are submitted, thereby preventing any benefits of the spam submissions.

The methods and systems discussed herein provide for a technical solution to the problem of spam transaction submissions in a blockchain network. By presenting computational challenges to sender devices 108 that submit new blockchain transactions, the ability for a sender device 108 to repeatedly submit fake transactions to the blockchain network 104 is diminished. By utilizing scaling difficulty that takes such transactions into account, nefarious entities may be heavily penalized from submitting blockchain transactions, whereas genuine entities may be able to proceed in standard fashion. Thus, the methods and systems discussed herein provide for a solution that reduces spam without adversely affecting the operation of the blockchain network or entities not engaging in any nefarious activity.

Processing Server

Figure 2:
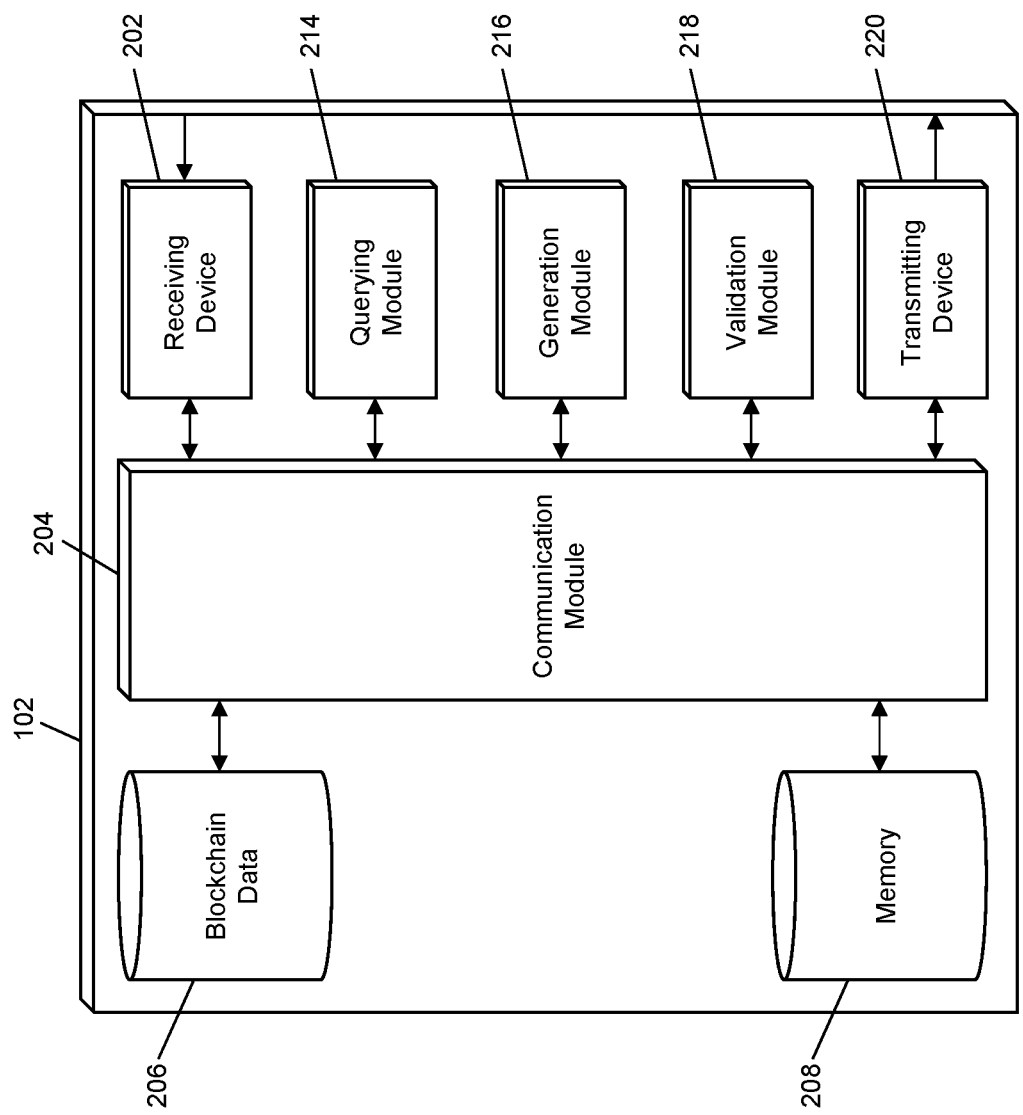
FIG. 2 is a block diagram illustrating the processing server of the system of FIG. 1 for reducing spam transaction submissions in accordance with exemplary embodiments.

FIG. 2 illustrates an embodiment of the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some embodiments, blockchain nodes 106 in the blockchain network 104 illustrated in FIG. 1 may include the components illustrated in the processing server 102 of FIG. 2 and be configured to perform the functions discussed herein.

The processing server 102 may include a receiving device 202. The receiving device 202 may be configured to receive data over one or more networks via one or more network protocols. In some instances, the receiving device 202 may be configured to receive data from blockchain nodes 106, sender devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain nodes 106 that may be superimposed or otherwise encoded with new transactions for confirmation, confirmed blockchain transactions, new blocks for confirmation, confirmed blocks for addition to the blockchain, messages regarding block confirmations, blockchain network load data, etc. The receiving device 202 may also be configured to receive data signals electronically transmitted by sender devices 108, which may be superimposed or otherwise encoded with transaction requests, new blockchain transactions, public keys, digital signatures, response messages, computational challenge responses, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 208. The memory 208 may be configured to store data for use by the processing server 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 106 and blockchain networks 104, address generation and validation algorithms, digital signature generation and validation algorithms, hashing algorithms for generating reference values, rules regarding generation of new blocks and block headers, a pool of pending transactions, computational challenge rules and data, computational challenge responses, blockchain network load information, blockchain wallet data, challenge difficulty data, etc.

The processing server 102 may also include blockchain data 206, which may be stored in the memory 208 of the processing server 102 or stored in a separate area within the processing server 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 106, collected mining bids, mining bid weighting and selection rules, etc. In some cases, the blockchain data 206 may include data associated with blockchain wallets for use in identifying difficulty of computational challenges, such as a transaction history, transaction volume data, number of failed challenge responses, number of failed transactions, etc.

The processing server 102 may include a querying module 214. The querying module 214 may be configured to execute queries on databases to identify information. The querying module 214 may receive one or more data values or query strings, and may execute a query string based thereon on an indicated database, such as the memory 208 of the processing server 102 to identify information stored therein. The querying module 214 may then output the identified information to an appropriate engine or module of the processing server 102 as necessary. The querying module 214 may, for example, execute a query on the memory 208 to identify computational challenges or rules for the identification thereof, information to be used in determining the difficulty of a computational challenge, etc.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate new blockchain data values, new block headers, Merkle roots, new blocks, and other data for operation of the blockchain. The generation module 216 may also be configured to generate a computational challenge for presentation to a sender device 108, where the difficulty of the computational challenge may vary as a result of applicable criteria, such as a transaction history of the sender device 108, pending transaction volume of the blockchain network 104, etc.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to confirm blockchain transactions by analyzing blockchain data values in the blockchain to ensure that the sender device 108 is authorized to use the transaction outputs included in the new transaction submission and that the transaction outputs have not been previously used to transfer currency in another transaction. The validation module 218 may also be configured to validate digital signatures using public keys and suitable signature generation algorithms. The validation module 218 may be further configured to validate responses to computational challenges, such as by determining if the response is a correct answer to the computational challenge, which may vary based on the challenge and the associated difficulty. For instance, in the above example, the validation module 218 may combine the provided data value and the nonce received from the sender device 108, hash the combined data, and determine if the resulting value has at least a predetermined number of leading zeroes.

The processing server 102 may also include a transmitting device 220. The transmitting device 220 may be configured to transmit data over one or more networks via one or more network protocols. In some instances, the transmitting device 220 may be configured to transmit data to blockchain nodes 106, sender devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 106 that are superimposed or otherwise encoded with new blockchain data values, new blocks for confirmation, confirmed blocks, messages regarding block or transaction confirmations, and other data used in the operation and management of the blockchain. The transmitting device 220 may also be configured to electronically transmit data signals to sender devices 108, which may be superimposed or otherwise encoded with computational challenges, notifications regarding challenge validations, notifications regarding difficulty determinations, notifications regarding transaction processing, etc.

Process for Reducing Spam Blockchain Transaction Submissions

Figure 3:
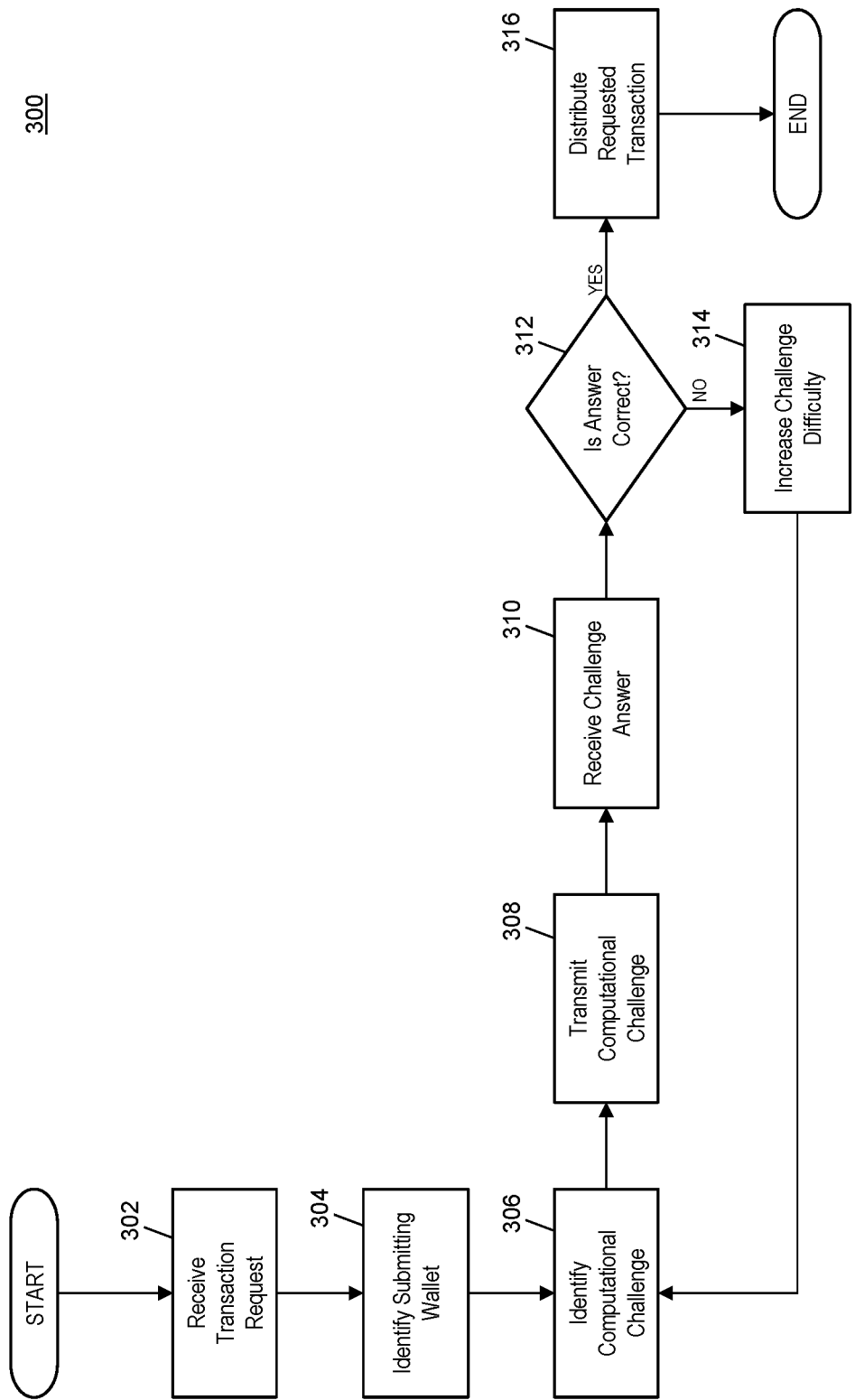
FIG. 3 is a flow diagram illustrating a process for reducing spam transaction submissions in a blockchain network as executed by the processing server of FIG. 2 in the system of FIG. 1 in accordance with exemplary embodiments.

FIG. 3 illustrates a process 300 for reducing spam blockchain transaction submissions in the blockchain network 104 of the system 100 in FIG. 1 as performed by the processing server 102 illustrated in FIG. 2 and discussed above.

In step 302, the receiving device 202 of the processing server 102 may receive a transaction request from the sender device 108, which may be submitted using any suitable communication network and method. The transaction request may include at least a public key of the cryptographic key pair of the blockchain wallet associated with the sender device 108. The transaction request may also include a new blockchain transaction being submitted by the sender device 108, which may include a digital signature, one or more unspent transaction outputs, one or more destination addresses and, for each destination address, a transfer amount of cryptographic currency. In step 304, the processing server 102 may identify the blockchain wallet that is submitting the transaction, such as by executing, by the querying module 214 of the processing server 102, a query on the blockchain data 206 to identify the blockchain wallet using the public key included in the transaction request.

In step 306, the processing server 102 may identify a computational challenge to present to the sender device 108. The computational challenge may be identified by identifying a difficulty based on a transaction history or other data associated with the identified blockchain wallet, a current load of the blockchain network 104, and other criteria as discussed herein. The generation module 216 of the processing server 102 may generate a computational challenge that has the identified difficulty. In step 308, the transmitting device 220 of the processing server 102 may electronically transmit the computational challenge to the sender device 108 using a suitable communication network and method. In step 310, the receiving device 202 of the processing server 102 may receive an answer to the computational challenge from the sender device 108, submitted thereby using a suitable communication network and method.

In step 312, the validation module 218 of the processing server 102 may attempt to validate the answer received from the sender device 108 to determine if the answer is a correct answer to the computational challenge. If the answer is incorrect, then, in step 314, the processing server 102 may increase the difficulty for the computational challenge. The process 300 may then return to step 306, where the generation module 216 of the processing server 102 may generate a new, more difficult computational challenge that is presented to the sender device 108. If, in step 312, the validation module 218 determines that the computational challenge was answered correctly by the sender device 108, then, in step 316, the transmitting device 220 of the processing server 102 may distribute the new blockchain transaction that was included in the transaction request to blockchain nodes 106 in the blockchain network 104 for confirmation and, if confirmed, inclusion in a new block that is generated and added to the blockchain.

Exemplary Method for Reducing Spam Transaction Submission

Figure 4:
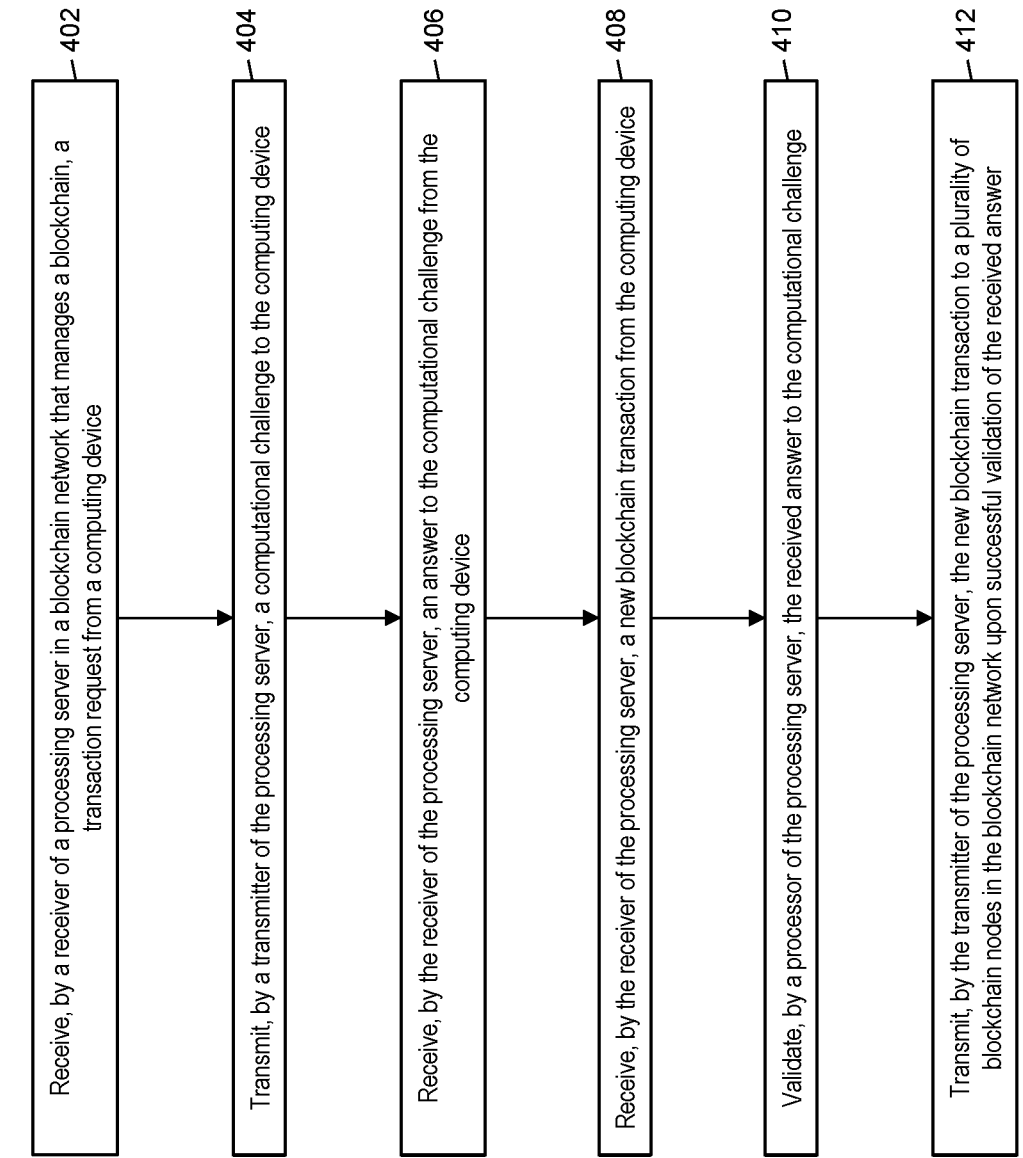
FIG. 4 is a flow chart illustrating an exemplary method for reducing spam transaction submissions in a blockchain network in accordance with exemplary embodiments.

FIG. 4 illustrates a method 400 for reducing the submission of spam blockchain transactions in a blockchain network using a computational challenge with scalable difficulty.

In step 402, a transaction request may be received by a receiver (e.g., receiving device 202) of a processing server (e.g., processing server 102) in a blockchain network (e.g., blockchain network 104) that manages a blockchain, from a computing device (e.g., sender device 108). In step 404, a computational challenge may be transmitted to the computing device by a transmitter (e.g., transmitting device 220) of the processing server. In step 406, an answer to the computational challenge may be received by the receiver of the processing server from the computing device.

In step 408, a new blockchain transaction may be received by the receiver of the processing server from the computing device. In step 410, the received answer to the computational challenge may be validated by a processor (e.g., validation module 218) of the processing server. In step 412, the new blockchain transaction may be transmitted to a plurality of blockchain nodes (e.g., blockchain nodes 106) in the blockchain network by the transmitter of the processing server upon successful validation of the received answer.

In one embodiment, the method 400 may further include identifying, by the processor (e.g., generation module 216) of the processing server, the computational challenge. In a further embodiment, the transaction request may include a wallet identifier and a difficulty for the computational challenge may be based on the wallet identifier. In another further embodiment, a difficulty for the computational challenge may be based on a transaction load for the blockchain network.

In some embodiments, the new blockchain transaction and the answer to the computational challenge may be received in a single transmission from the computing device. In one embodiment, the new blockchain transaction may be received after successful validation of the received answer. In some embodiments, the computational challenge may include a nonce transmitted to the computing device, and the answer to the computational challenge may include a predetermined number of leading zeroes for successful validation. In a further embodiment, increasing a difficulty of the computational challenge may include increasing the predetermined number of leading zeroes for successful validation.

Computer System Architecture

FIG. 5 illustrates a computer system 500 in which embodiments of the present disclosure, or portions thereof, may be implemented as computer-readable code. For example, the processing server 102 and blockchain nodes 106 of FIG. 1 and the processing server 102 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), lightemitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for reducing spam transaction submission in a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for reducing spam transaction submission in a blockchain network, comprising:
receiving, by a receiver of a processing server in a blockchain network that manages a blockchain, a transaction request from a computing device;
transmitting, by a transmitter of the processing server, a computational challenge to the computing device;
receiving, by the receiver of the processing server, an answer to the computational challenge from the computing device;
receiving, by the receiver of the processing server, a new blockchain transaction from the computing device;
validating, by a processor of the processing server, the received answer to the computational challenge; and
transmitting, by the transmitter of the processing server, the new blockchain transaction to a plurality of blockchain nodes in the blockchain network upon successful validation of the received answer.

2. The method of claim 1, wherein the method further comprises identifying, by the processor of the processing server, the computational challenge.

3. The method of claim 2, wherein
the transaction request includes a wallet identifier, and
a difficulty for the computational challenge is based on the wallet identifier.

4. The method of claim 2, wherein a difficulty for the computational challenge is based on a transaction load for the blockchain network.

5. The method of claim 1, wherein the new blockchain transaction and the answer to the computational challenge are received in a single transmission from the computing device.

6. The method of claim 1, wherein the new blockchain transaction is received after successful validation of the received answer.

7. The method of claim 1, wherein
the computational challenge includes a nonce transmitted to the computing device, and
the answer to the computational challenge includes a predetermined number of leading zeroes for successful validation.

8. The method of claim 7, wherein increasing a difficulty of the computational challenge includes increasing the predetermined number of leading zeroes for successful validation.

9. A system for reducing spam transaction submission in a blockchain network, comprising:
a blockchain network managing a blockchain;
a plurality of nodes included in the blockchain network;
a computing device; and
a processing server in the blockchain network, the processing server including
a receiver receiving a transaction request from the computing device,
a transmitter transmitting a computational challenge to the computing device, and
a processor, where
the receiver further receives
an answer to the computational challenge from the computing device, and
a new blockchain transaction from the computing device,
the processor validates the received answer to the computational challenge, and
the transmitter transmits the new blockchain transaction to the plurality of blockchain nodes in the blockchain network upon successful validation of the received answer.

10. The system of claim 9, wherein the method further comprises identifying, by the processor of the processing server, the computational challenge.

11. The system of claim 10, wherein
the transaction request includes a wallet identifier, and a difficulty for the computational challenge is based on the wallet identifier.

12. The system of claim 10, wherein a difficulty for the computational challenge is based on a transaction load for the blockchain network.

13. The system of claim 9, wherein the new blockchain transaction and the answer to the computational challenge are received in a single transmission from the computing device.

14. The system of claim 9, wherein the new blockchain transaction is received after successful validation of the received answer.

15. The system of claim 9, wherein
the computational challenge includes a nonce transmitted to the computing device, and
the answer to the computational challenge includes a predetermined number of leading zeroes for successful validation.

16. The system of claim 15, wherein increasing a difficulty of the computational challenge includes increasing the predetermined number of leading zeroes for successful validation.

* * * * *